(12) United States Patent
Langeland

(10) Patent No.: US 8,462,581 B2
(45) Date of Patent: Jun. 11, 2013

(54) MARINE SEISMIC SURVEY SYSTEM AND METHOD FOR ACTIVE STEERING OF SOURCE ARRAYS IN SUCH A SYSTEM

(75) Inventor: Jan-Age Langeland, Indre Arna (NO)

(73) Assignee: Cggveritas Services (Norway) AS, Laksevag (NO)

( * ) Notice: Subject to any disclaimer, the term of this patent is extended or adjusted under 35 U.S.C. 154(b) by 0 days.

(21) Appl. No.: 13/642,701

(22) PCT Filed: Jun. 21, 2011

(86) PCT No.: PCT/EP2011/060375
§ 371 (c)(1),
(2), (4) Date: Oct. 22, 2012

(87) PCT Pub. No.: WO2011/161118
PCT Pub. Date: Dec. 29, 2011

(65) Prior Publication Data
US 2013/0039148 A1 Feb. 14, 2013

(30) Foreign Application Priority Data
Jun. 21, 2010 (NO) .................................. 20100892

(51) Int. Cl.
*G01V 1/38* (2006.01)
(52) U.S. Cl.
USPC ........................................... 367/16; 114/254
(58) Field of Classification Search
USPC ................................ 367/15–20; 114/253–254
See application file for complete search history.

(56) References Cited

U.S. PATENT DOCUMENTS
7,415,936 B2 * 8/2008 Storteig et al. ................ 114/254

FOREIGN PATENT DOCUMENTS
| GB | 2414804 A | 7/2005 |
| GB | 2424950 A | 11/2006 |
| GB | 2436456 A | 9/2007 |
| WO | 01/16623 A1 | 3/2001 |

OTHER PUBLICATIONS

International Search Report and Written Opinion mailed on Oct. 11, 2011 in related application No. PCT/EP2011/060375.
Norwegian Search Report issued in corresponding application No. 20100892 dated Jan. 4, 2011.

* cited by examiner

*Primary Examiner* — Isam Alsomiri
*Assistant Examiner* — Krystine Breier
(74) *Attorney, Agent, or Firm* — Potomac Patent Group, PLLC

(57) ABSTRACT

A seismic survey array that includes one or more streamers adjustably fixed to a towing vessel by at least a first deflected lead-in and a second deflected lead-in and at least one group of source arrays having one or more devices for generating pulses in water vessel. The array is further provided with means for laterally and/or longitudinally changing the position of the source array(s) with respect to the vessel and/or its direction of motion, the means including a wire and winching system. The means for adjusting the position of the source arrays further includes a wire or rope with one end fixed to one front end of the units and extending from the unit to the adjacent lead-in and back to a capstan arranged on the front end of the unit.

10 Claims, 4 Drawing Sheets

MARINE SEISMIC SURVEY SYSTEM AND METHOD FOR ACTIVE STEERING OF SOURCE ARRAYS IN SUCH A SYSTEM

TECHNICAL FIELD OF THE INVENTION

The present invention relates to a marine seismic survey system and a method for active steering of source arrays in such a system.

More specifically, the invention relates to survey systems in which at least one group of seismic source array units is towed by a vessel, the system comprising leads-in between which said group of seismic source array units is towed.

BACKGROUND FOR THE INVENTION

When towing a seismic array comprising a plurality of long streamers and source arrays, both the towing vessel and the towed array as a unit and the various units of the tow will be subjected to wind, crosscurrent, waves, etc., affecting the relative position of the various elements of the tow and arrays.

In 4-D geophysical imaging, a 3-D seismic survey may be repeated several times over an area which previously has been surveyed, thereby for example indicating changes in the subsurface formation. In order to succeed, it is important that the various surveys shall be at the same location and that the shots are located as closely as possible to those of the previous surveys. It is also of importance that the various streamers follow the same route as for the previous surveys.

In order to control the position of the various streamers and source arrays, it is well known to provide both the streamers and the units of the source array with adjustable wings, enabling control of the unit in lateral direction with respect to each other, also sometimes used for adjusting the depth.

The winches for super wide ropes, lead-ins and gun umbilical cables allow some adjustment of the inline and cross-line positions, but not independent adjustment of one of the units. The further out the cables are let, the wider the spread will go.

It is also known to adjust the position of the source arrays laterally with respect to the vessel and the streamers by using a winch system.

U.S. Pat. No. 7,415,936 describes such latter seismic survey system which includes a winch having a winch cable connectable to a source array towable between two deflected leads-ins. Further, the system comprises a positioning system for determining a current position of the source array and a control means for adjusting the winch to modify the position of the source array to a desired cross line position. The winches may be attached to the deflected lead-ins or mounted on the tow vessel. The winches exert lateral forces on the source array, derived from the deflected lead-ins, to control the inline position of the source array. By applying an adjusting force to the source array the lateral or cross-line position of the source array may be changed into a desired cross-line position.

There is a need for a solution where the cross-line position of the source array easily and quickly may be changed without being dependent on large power consumption an/or without jeopardizing the operation due to possible wire backlash on the winch drums.

SUMMARY OF THE INVENTION

An object of the present invention is to provide a solution where the relative cross-line position of the source array easily and quickly may be adjusted with respect to streamers or the deflected lines of the survey.

Another object of the present invention is to provide a solution where the energy consumption for adjusting the relative cross-line position of the source array is optimized by balancing the forces, reducing such consumption as much as possible.

Yet another object of the present invention is to provide a solution where the forces acting in the line is kept as constant as possible, thereby avoiding the possibility of causing backlash on the winch drums.

A still further object of the present invention is to provide a solution where adjustment is made by means of cross-line adjustment means arranged on the source array, without having to increase power transmission capacity from the vessel to the source array to any substantial degree.

It is proposed a marine survey system comprising at least one group of seismic source array units towed by a vessel, each of said units having a front end and also comprising leads-in between which said group of seismic source array units is towed, at least two of the leads-in being deflected. The source arrays can be of the type comprising one or more devices for generating pulses in water At least one deflection line couples the source array units to said an adjacent lead-in, said adjacent lead-in being a deflected lead-in or a lead-in connected to at least one of said deflection leads-in. The system also comprises a capstan on which said deflection line is engaged, said capstan being rotatable in a first or a second direction to adjust the position of the group of seismic source array units. The deflection line is connected to one of the seismic source array units and the capstan is arranged on the front end of said unit to which the deflection line is connected, said deflection line extending from said unit to the adjacent lead-in and back to said capstan arranged on the front end of said unit.

The system may comprise one or more streamers connected to the towing vessel. Both the lead-ins and cables extending between the vessel and the array can be connected to one or more winches on board the vessel The system can comprise a system laterally and/or longitudinally changing the position of the source array(s) with respect to the vessel and/or its direction of motion. Said system comprising ropes and winches for lateral adjustment. It also comprises main winches on board the vessel for longitudinal adjustment.

The deflection line can be a wire or rope that has one end connected to one front end of the units of the source array and that extends from said unit to the adjacent lead-in and back to a capstan arranged on a front end of said unit.

The deflection line (wire or rope) may be adapted to run over a pulley or a block attached to adjacent lead-in or a deflected line and may preferably further extends from the capstan via one or more pulleys or blocks on an adjacent group of source arrays to a block fixed on the second deflected lead-in and back to a front end of adjacent unit of the second group of source array(s).

The source arrays may comprise two or more separate groups of source arrays, each member of each group of source arrays being towed by the vessel by means of gun cables and being interconnected by means of transversely arranged wires.

According to another embodiment, a similar system may be applied to a neighboring group of source arrays.

Further, a winch or an additional capstan may preferably be placed at one or both end points of the rope or wire in order to adjust the length of the wire or rope. Further, the free end of the rope or the wire passing over a capstan may preferably be connected to a rubber element or a drougue chute in order to provide the required tensioning in the wire or the rope.

According to the present inventions several capstans may be synchronized or can be selected to freewheel or pull.

According to an embodiment the capstans may be replaced by a double drum winch, configured and arranged so that one drum pays out rope when the other drum pulls in rope.

In a method for deploying source arrays in a marine seismic survey array towed by a vessel, the array may comprise at least a first and a second lead-in and/or deflected line located on opposite sides with respect to the vessel. At least one group of source arrays may be connected to the vessel by means of lead-ins, with means for at least changing the cross-line position of the source array(s) with respect to the vessel and/or its direction of motion. A step of the method comprises the steps of adjustably connecting a front end point of the source array to both lead-ins or to both deflected ropes, so that adjustment to the connections between said point(s) of the source array and the lead-ins or deflected ropes may balance each other.

Accordingly, said adjustment to the connections may be achieved by running a capstan or a winch with associated rope system and one or more pulleys, pulling the source array in a cross-line direction.

Said adjustment to the connections may also be provided by allowing a capstan or a winch with associated rope system and one or more pulleys to free-wheel, adjusting the position of the source array in a cross-line direction.

The system provided is a system where the powering element for the cross line adjustment of the source array is a capstan or winch arranged on the source array and that the forces are balanced out by connecting one side of the source array with the opposite side by means of a rope running through pulleys attached to a lead-in or a super wide rope on each side of the array. Hence the forced required for powering such system is reduced, thus also requiring reduced power transmission from in the power line from the vessel.

A marine seismic source array unit comprising a source array and a front end from which the source array extends, wherein it comprises a capstan arranged on said front end, is also proposed.

SHORT DESCRIPTION OF THE DRAWINGS

An embodiment of the invention shall be described in further detail below, referring to the drawings wherein.

DETAILED DESCRIPTION OF THE INVENTION

Figure 1:
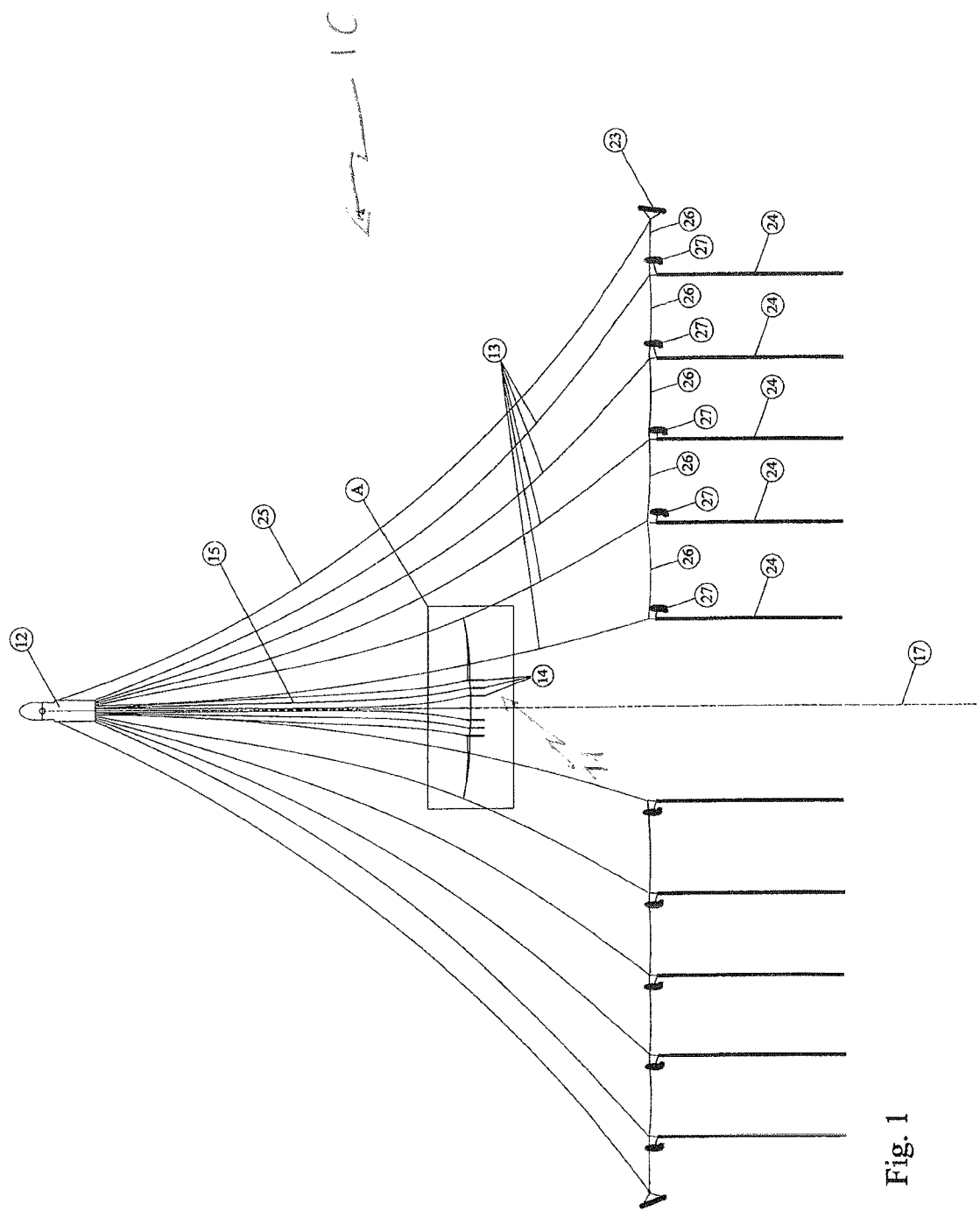
FIG. 1 shows schematically an aerial view of a marine seismic survey system according to a possible embodiment of the present invention.

FIG. 1 shows schematically an aerial view of a marine seismic survey system 10, with a control system for controlling the cross-line position of a source array 11.

The seismic array survey system 10 comprises a tow vessel 12, two deflected super wide ropes 25, a set of streamers 24 towed by means of lead-ins 13 and a source array 11 towed by means of lead-ins 15 and a gun umbilical cable. The two super wide ropes 25 are deflected by means of conventional deflectors 23. Each lead-in 13 and lead-in 15 is at one end fixed to the fore end of a source array 14 and of a streamer 24 respectively. The opposite end of the lead-ins 13, 15 are wound on winch drums on board the tow vessel 12, the super wide ropes 25 being also wound on a winch drum onboard the tow vessel 12. In the survey system represented on FIG. 1, the streamers 24 are separated into two groups. The front ends of two successive streamers 24 within a group are interconnected by means of a cross-line distance rope 26. Further, the front wing streamer 24 is also connected to the deflector 23 by means of a cross-line distance rope 26. Hence, cross-line distance ropes 26 extend preferably continuously along the entire distance between the deflector 23 and the front end of the centre streamer, allowing predetermining the maximum allowable distance between adjacent streamers. In addition, each front end of a streamer 24 is connected to a marking float 27.

Figure 2:
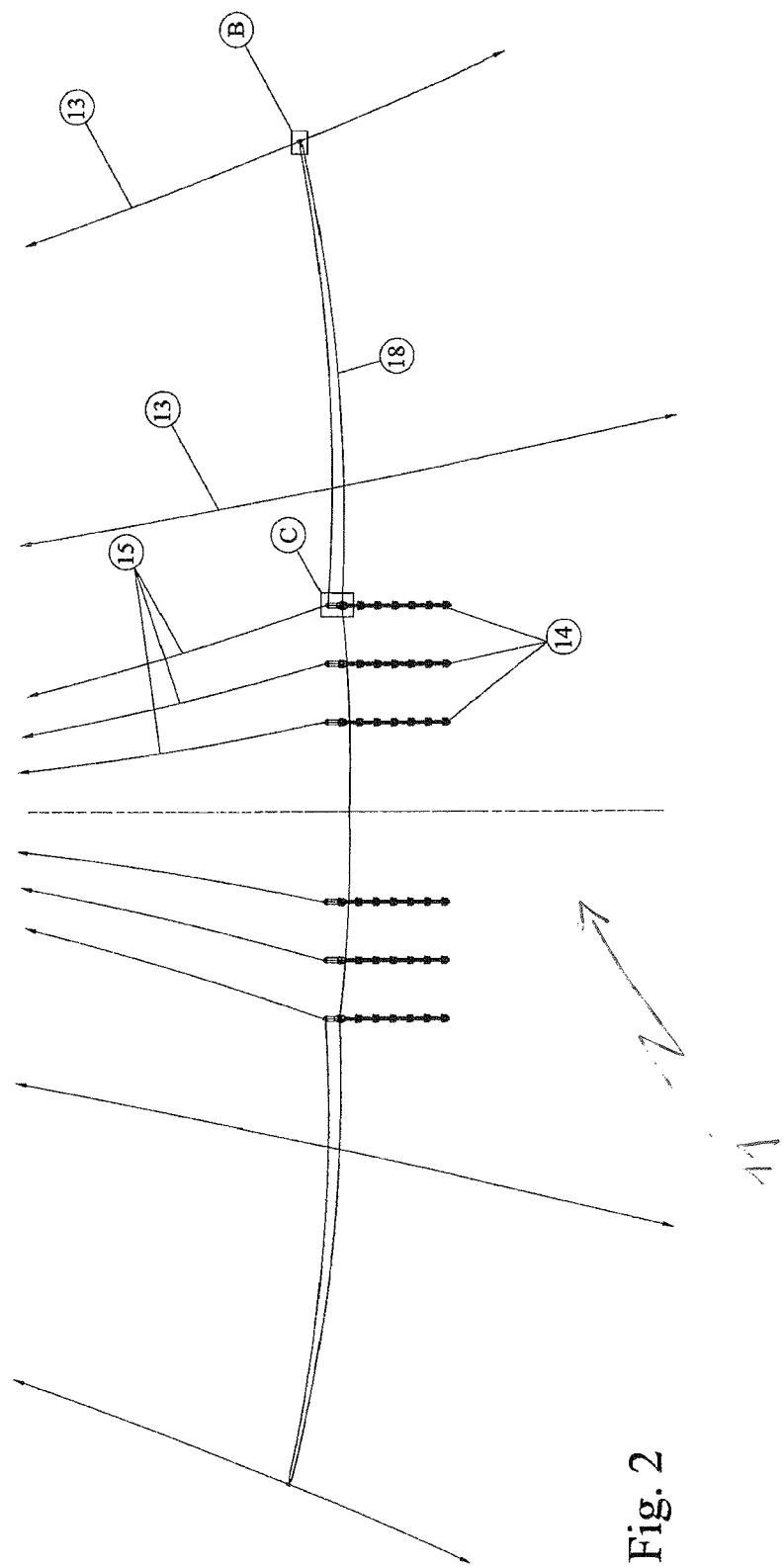
FIG. 2 shows schematically an aerial view in enlarged scale of the part of the marine seismic survey system within the rectangle marked A in FIG. 1.

As indicated in FIG. 2, the source array 11, comprises a number of air gun sub-arrays 14, each air gun sub-array 14 being towed by the vessel 12 by means of a cable 15, connected to the winch system onboard the vessel 12. In the example shown in FIGS. 1 and 2, the source array 11 comprises two groups of sub-arrays 14, each air gun sub-array 14 in each group being tied together at the front end by means of distance ropes. In a conventional manner, the deflectors 23 on the super wide ropes 25 are used for pulling the seismic streamers 24 sideways and outwards off the centre line 17 of the vessel 12.

The source sub-arrays 14 are pulled off the centre line 17 by means of a deflection line 18, one end of each such line 18 being fixed to the front end of each of the two extreme outer wing sub-arrays 14. The line 18 runs from said front end (FIG. 3) outwards to and over a pulley 19 (FIG. 4) or a block fixed to an adjacent tie-in 13 or a deflected line 25 and back to the front end of the extreme, outer wing sub-array 14.

Figure 3:
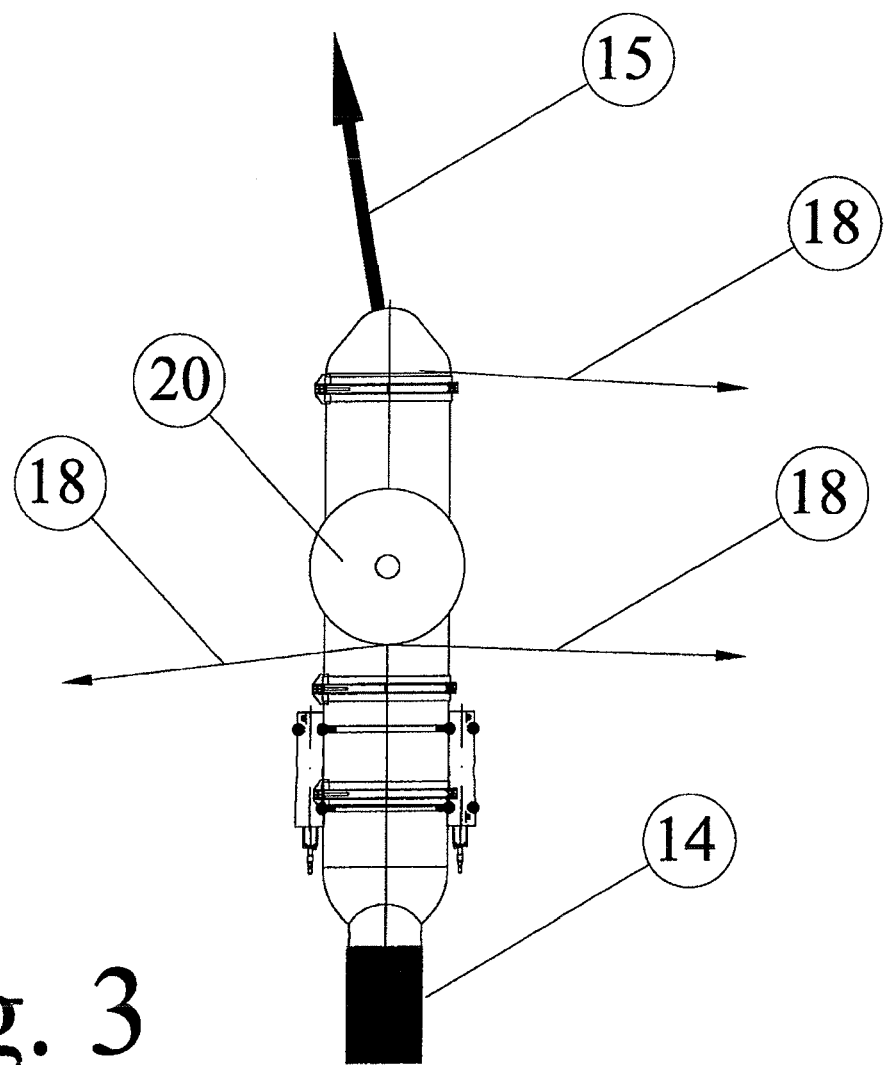
FIG. 3 shows schematically an aerial view in enlarged scale the attachment point and the position of a capstan on the front of a wing source array within the square marked C in FIG. 2.
Figure 4:
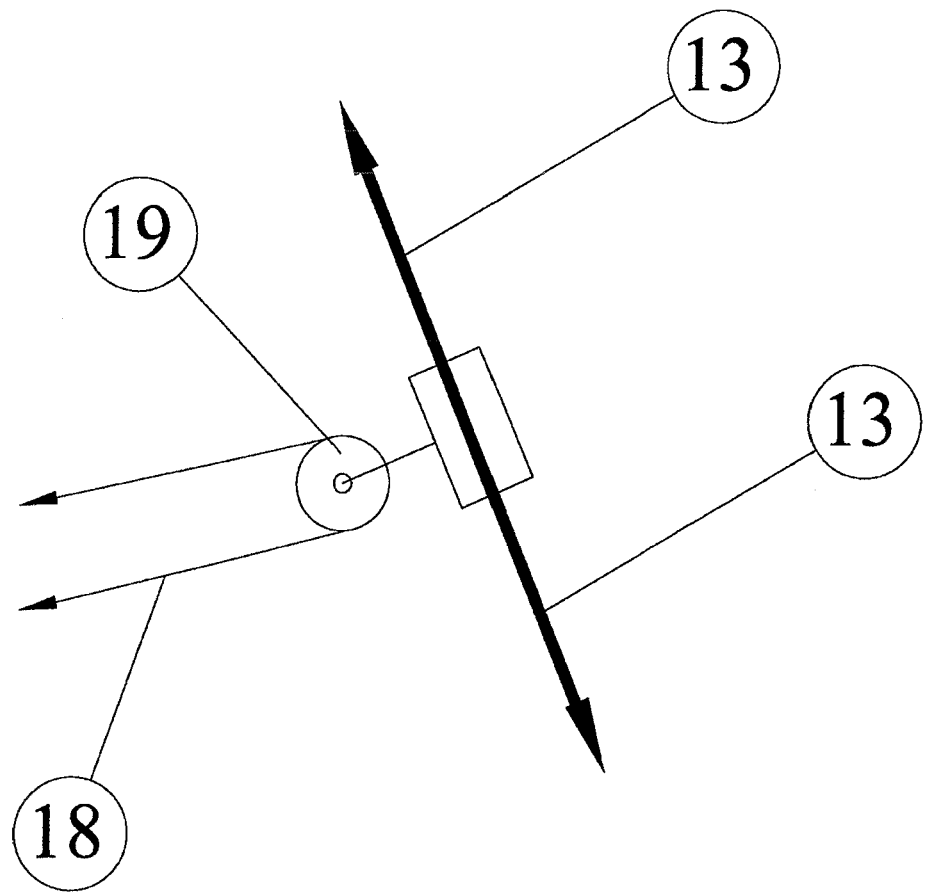
FIG. 4 shows schematically an aerial view in enlarged scale of the pulley point on the lead-in within the rectangle marked B in FIG. 2.

Reference is also made to FIGS. 3 and 4. On said outer wing air gun sub-array 14, the rope 18 runs over a capstan 20 and then further along over a second pulley or block fixed to the front end of the opposite wing sub-array 14. From said second pulley or block fixed to the opposite extreme outer wing sub-array 14, the line 18 then extends to an opposite adjacent lead-in 13 for the streamers 24 or deflected line 25, passing over a pulley 19 fixed to the opposite tie-in 13 and then back to the front end of said opposite extreme outer air gun sub-array 14 where the rope is fixed. In addition cross-line ropes may be used, fixing two source arrays in one source array group together in lateral direction. In such manner the maximum distance between two adjacent arrays will be known, and further, the two groups of source arrays will function as one unit when the rope 18 is pulled in one or the other direction.

The capstan 20 may comprise a rotative drum. It is mounted on the front end termination of the outer air gun sub-array 14 which bears said capstan, for example, on the metallic housing of said termination. The rotation axis of the drum of capstan 20 extends perpendicular to the main general axis along which said front end termination extends.

A motor—such as an electrical motor—is also mounted or integrated on said front end termination. It drives the rotation of said drum around its axis. Said motor is of a type requiring a minimum of energy to run.

The line may be turned a number of time around the drum of the capstan 20. A control unit on board of vessel 12 actively drives the motor of capstan 20, through a gun umbilical cable, so as to rotate its drum in one direction or the other when it becomes necessary to adjust the cross-line position of the source array. The drum of the capstan is then rotated in the desired direction whereby the line 18 is pulled in on one side of the capstan 20 and paid out at the opposite side of the capstan 20, thus providing more or less the same tension in the line 18 at either side of the drum of the capstan 20. In such way, the source array as a unit may be moved in either direction. An active steering is thus performed in a quick, effective and energy efficient way without having to depend on heavy energy consumption. Due to the configuration and rigging of such system the tension in the rope 18 will be substantially constant.

It should be appreciated that the pulleys of the system (pulleys 19 as well as pulleys on the outer sub-arrays 14) may be in the form of freewheeling capstans, or of any other conventional pulleys or the like, providing as small resistance friction as possible.

Further, it should be appreciated that the system may be provided with a positioning system and a control unit, controlling the system at any time during operation so as to secure correct position or course with respect to a predefined position or course.

Instead of fixing the ends of the ropes, they may be connected to a winch or a capstan to enable adjustment of the length of the rope, and thereby adjusting the separation between the two source array groups. This will typically be an adjustment that is only required at the start of each seismic survey line, and a higher energy consumption can therefore be accepted. In the case that a capstan is used in this position, the free end of the rope can be tensioned by an elastic rubber element or a drougue chute.

It should be appreciated that the present invention is not limited to the configuration of streamers and source arrays as shown. Further, the number of towing cables, lead-ins, streamers and source arrays may be varied without thereby deviating from the inventive idea.

Even though an marine survey array using streamers 24 is shown, the system may be used without towed streamers as, for example, a sea bed application having sensors in connection on the sea bed with the vessel 12 towing source arrays 14, i.e. seabed acquisition (with so-called OBC cables). In such case, the super wide ropes 25, i.e. the rope going from the vessel 12 to the deflectors 23, may be used directly, the pulleys/winches 19,22 being attached to said super wide ropes 25.

Further, it should be appreciated that the rope 18 may be fixed to the front end of each source array, also functioning as a cross-line. In such case the conventional cross-line between two and two source arrays may be omitted.

What is claimed is:

1. A marine survey system comprising:
   at least one group of seismic source array units towed by a vessel, each of said units having a front end,
   leads-in between which said group of seismic source array units is towed, at least two of the leads-in being deflected,
   at least one deflection line coupling the source array units to said an adjacent lead-in, said adjacent lead-in being a deflected lead-in or a lead-in connected to at least one of said deflection leads-in,
   a capstan on which said deflection line is engaged, said capstan being rotatable in a first or a second direction to adjust the position of the group of seismic source array units
   wherein the deflection line is connected to one of the seismic source array units and the capstan is arranged on the front end of said unit to which the deflection line is connected,
   said deflection line extending from said unit to the adjacent lead-in and back to said capstan arranged on the front end of said unit.

2. System according to claim 1, wherein the deflection line is adapted to run over a pulley or a block attached to adjacent lead-in.

3. System according to claim 1, wherein the deflection line further extends from the capstan via one or more pulleys or blocks on an adjacent group of source arrays to a pulley or block fixed on a second lead in on the opposite side of the array and back to a front end of adjacent unit of the second group of source array(s).

4. System according to claim 1, wherein the source arrays comprises two separate groups of arrays, each member of each group of source arrays being towed by the vessel by means of towing cables and being interconnected by means of transversely arranged wires or ropes.

5. System according to claim 1, wherein a similar system is applied to a neighboring group of source arrays.

6. System according to claim 1, wherein a winch or an additional capstan is placed at one or both end points of the rope or wire in order to adjust the length of the wire or rope.

7. System according to claim 6, wherein the free end of the rope or the wire passing over a capstan is connected to a rubber element or a drougue chute in order to provide the required tension in the wire or the rope.

8. System according to claim 1, wherein several capstans are used said capstans being synchronized or can be selected to freewheel or pull.

9. System according to claim 1, wherein the capstan comprises a double drum winch, configured and arranged so that one drum pays out rope when the other drum pulls in rope.

10. Marine seismic source array unit comprising:
    a source array with a front end from which the source array extends, wherein the source array comprises a capstan arranged on said front end and wherein the capstan is rotatable in a first and second direction; and
    a deflection line which extends from the capstan to an adjacent lead-in and back to the capstan.

* * * * *